US007078360B2

(12) United States Patent
Gist et al.

(10) Patent No.: US 7,078,360 B2
(45) Date of Patent: Jul. 18, 2006

(54) HIGH DURABILITY REFRACTORY COMPOSITION

(75) Inventors: Bernard D. Gist, Roseto, PA (US); Joseph Michael Schmidt, Saylorsburg, PA (US)

(73) Assignee: Specialty Minerals (Michigan) Inc., Bingham Farms, MI (US)

( * ) Notice: Subject to any disclaimer, the term of this patent is extended or adjusted under 35 U.S.C. 154(b) by 0 days.

(21) Appl. No.: 10/783,514

(22) Filed: Jul. 12, 2004

(65) Prior Publication Data

US 2006/0009346 A1 Jan. 12, 2006

(51) Int. Cl.
*C04B 35/04* (2006.01)
(52) U.S. Cl. ...................................... 501/109; 501/123
(58) Field of Classification Search ................ 501/108, 501/109, 123
See application file for complete search history.

(56) References Cited

U.S. PATENT DOCUMENTS

| 3,971,665 | A | 7/1976 | Suzuki et al. |
| 4,383,045 | A | 5/1983 | Nagle et al. |
| 4,923,831 | A | 5/1990 | Uzaki et al. |

FOREIGN PATENT DOCUMENTS

| EP | 0 119 812 | | 5/1992 |
| JP | 62148377 A | * | 7/1987 |
| JP | HEI 1-278469 | | 11/1989 |
| JP | HEI 3-170363 | | 7/1991 |
| JP | HEI 4-21573 | | 1/1992 |
| JP | 05-286771 | | 11/1993 |

OTHER PUBLICATIONS

O'Bannon, Dictionaryof Ceramic Science and Engineering, p. 45, 1984.*
Yorita et al, "Quick Hardening Gunning Refractory Composition," translation of JP 62-148377, Jul. 2, 1987.*

* cited by examiner

*Primary Examiner*—David Sample
(74) *Attorney, Agent, or Firm*—Leon Nigohosian, Jr.; George H. Fairchild; Won Joon Kouh

(57) ABSTRACT

A high temperature hot strength magnesia-based refractory composition having high durability at elevated temperatures wherein a sulfamic acid in combination with an independent calcia source is added to a magnesia-based refractory material. The invention also provides for a refractory gunning composition for use in the production or repair of metallurgical furnace linings.

20 Claims, 2 Drawing Sheets

1370 Degree Celsius Hot Breaking Strength

1510 Degree Celsius Hot Breaking Strength

HIGH DURABILITY REFRACTORY COMPOSITION

FIELD OF THE INVENTION

This invention relates to refractory compositions. This invention relates to magnesia-based refractory compositions useful in maintenance gunning of metallurgical vessels, in ramming mixtures, in castable refractories, and in basic refractory brink. This invention relates to refractory compositions, especially gunning mixtures, which are chemically adhered by means of a binder system having high temperature hot strength.

BACKGROUND OF THE INVENTION

In the production of steel, the refractory brick linings of conventional process vessels generally wear unevenly due to hot spots, slag attack, or other operating parameters. In the ongoing attempt to minimize production costs, a major concern of steel makers is the wearing of the refractory brick lining of the vessel and the resultant consumption of refractory composition to replace the lining. In order to extend the useful life of such linings, it has become acceptable practice to repair excessively worn areas between heats by means of gunning granular refractory compositions onto the brick surfaces. For example, a dry mixture including granular refractory grain is pneumatically delivered to a nozzle of a spray gun where it is mixed with water, resulting in a bonded composition that is projected against the irregularly worn surface, thereby filling in or patching the unevenly worn refractory lining with the refractory composition. Under the usual circumstances, gunning is initiated within minutes after the molten steel is tapped from the hot vessel. When properly constituted and emplaced the gunning mixture is a relatively stiff pliable mass that adheres to the hot vessel lining and which quickly converts to a relatively hard non-pliable mass. As the temperature of the furnace rises during the next heat, components of the mixture more permanently bond the refractory grains to themselves and to the unevenly worn lining.

The granular refractory material used in gunning mixtures is typically composed of magnesia having a periclase crystalline phase. Such materials include dead burned natural magnesite and a synthetic periclase product derived from seawater or brine. Because of their comparatively lower cost in the market, dead burned dolomite and/or chrome ore grog, along with dead burned magnesite in different combinations, have also been conventionally employed as refractory material in gunning mixtures. However, due to the lack of any bonding when wetted with water, refractories must additionally include a binder to provide at least temporary strength to the composition throughout its entire use temperature range (110 degrees Celsius to 1760 degrees Celsius). Optionally, a clay mineral may also be included in the mixture as a gelling or plasticizing agent.

Both organic and inorganic binders have been employed for use in gunning mixtures. Representative organic binders have included starch, dextrin, various organic sulfonic acids and salts, and tars, pitches and resins, but all of these binders suffer a variety of drawbacks, which render them detrimental for use in gunning mixtures. For example, refractory mixtures containing organic sulfonic acids as a low temperature binder have been found to ignite and burn when applied between heats to the refractory brick lining of a hot (1200 degrees Celsius) metallurgical vessel, thereby compromising their ultimate utility. For the most part, organic additives contribute excessive porosity to the refractory composition thereby diminishing the repaired linings durability and strength.

Inorganic binders also pose problems when employed in gunning mixtures. Solid inorganic binders capable of being dissolved or dispersed in water have been in common use in gunning mixtures, and typical of these are chromic acid, sodium silicate, phosphate glasses, Epsom salts, and magnesium chloride. As with the organic additives, most of these binding agents suffer one or more disadvantages such as slowness of reaction or air setting, lack of strength at intermediate temperatures, poor slag resistance to name a few.

Silicates, phosphates and sulfates are generally the binders of choice for bonding magnesia-based refractory compositions, due primarily to their generally acceptable mechanical strength, slag resistance, and durability of the resultant products. Steel producers are constantly looking for compositions that will increase durability relative to current technology. This would decrease downtime and reduce the frequency of maintenance the metallurgical vessel requires for repair.

Therefore, what has been found to be new and novel is a refractory composition that improves upon the performance characteristics, such as hot strength, slag resistance, and overall durability, compared to current compositions being used to produce or repair refractory linings.

It is an objective of the present invention to provide a magnesia-sulfamic acid-calcia product having improved hot strength. Another objective of the present invention is to provide a magnesia-sulfamic acid-calcia refractory product exhibiting outstanding refractoriness i.e. this composition will not form deleterious low melting compounds that are formed when traditionally bonded compositions are used. A further objective of the present invention is to provide a magnesia-sulfamic acid-calcia refractory product outstanding in overall durability.

Additional objectives and features will become apparent from the following detailed description of the embodiments of the present invention.

SUMMARY OF THE INVENTION

Figure 1:
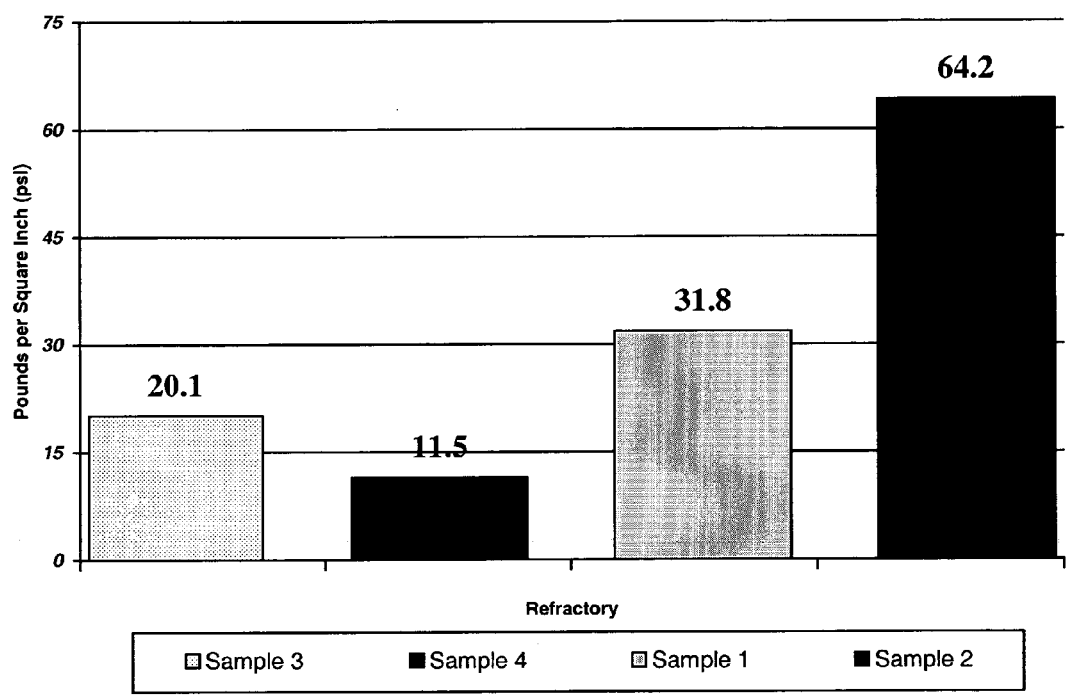
FIG. 1 is a graph comparing the 1370 degrees Celsius hot breaking strength of two high purity magnesia refractory compositions that are currently used for repairing refractory linings, with the hot breaking strength of the present invention.

The present invention provides a magnesia-sulfamic acid-calcia refractory composition that includes from about 87.0 percent to about 98.0 percent by weight of the total composition magnesia-based refractory material, from about 1.0 percent to about 5.0 percent by weight of the total composition sulfamic acid and from about 1.0 percent to about 8.0 percent by weight of the total composition calcium hydroxide.

Another aspect of the present invention provides a magnesia-sulfamic acid-calcia refractory composition that includes from about 91.0 percent to about 95.0 percent by weight of the total composition magnesia-based refractory material, from about 2.0 percent to about 4.0 percent by weight of the total composition sulfamic acid and from about 3.0 percent to about 5.0 percent by weight of the total composition calcium hydroxide.

A further aspect of the present invention provides a magnesia-sulfamic acid-calcia refractory composition that includes from about 92.0 percent to about 94.0 percent by weight of the total composition magnesia-based refractory material, from about 2.5 percent to about 3.5 percent by weight of the total composition sulfamic acid and from about 3.5 percent to about 4.5 percent by weight of the total composition calcium hydroxide.

In still a further aspect of the present invention provides a magnesia-sulfamic acid-calcia refractory composition that includes from about 92.0 percent to about 94.0 percent by weight of the total composition magnesia-based refractory material, from about 2.5 percent to about 3.5 percent by weight of the total composition sulfamic acid and from about 3.5 percent to about 4.5 percent by weight of the total composition calcium hydroxide, and, optionally a wetting agent from about 0.05 percent to about 0.5 percent by weight of the total composition may also be added.

In order to improve existing refractory repair compositions extensive research was done in an effort to find a refractory composition that would improve hot strength and overall durability. It was found when a combination of sulfamic acid and calcium hydroxide is added to a magnesia-based refractory material, a refractory lining is produced having greater durability and hot strength than currently used compositions. When the refractory composition of the present invention is used in gunning applications, a wetting agent may additionally be added to the composition.

DETAILED DESCRIPTION OF THE INVENTION

A magnesia based refractory material is admixed with sulfamic acid and an independent calcia source such as calcium hydroxide and/or calcium oxide. It was discovered that the use of sulfamic acid in combination with calcium hydroxide and/or calcium oxide results in a magnesia based refractory composition, having improved physical properties, at temperatures from about 110 degrees Celsius to about 1760 degrees Celsius over compositions currently used for production or repair of refractory furnace linings.

In one embodiment, the refractory composition of the present invention is a magnesia based refractory material in combination with sulfamic acid and calcia.

In another embodiment, the refractory composition of the present invention is a gunning composition of a magnesia based refractory material in combination with sulfamic acid, calcia and a wetting agent. The wetting agent may be any suitable dispersant, superplasticizer, anionic, cationic or nonionic surfactant, the selection of which for any particular composition would be understood by one of ordinary skill in the art of refractories.

In another embodiment the calcia is calcium oxide.

In another embodiment the calcia is calcium hydroxide.

In another embodiment the wetting agent is selected from the group consisting of a sulfonated naphthalene condensate, polycarboxylic ether and maleic acid copolymer superplasticizer.

In another embodiment the wetting agent is a sulfonated naphthalene condensate superplasticizer.

In another embodiment, the calcium hydroxide and/or calcium oxide concentration is from about 1.0 percent to about 8.0 percent by weight of the total refractory composition.

In another embodiment, the calcium hydroxide and/or calcium oxide concentration is from about 2.0 percent to about 4.0 percent by weight of the total refractory composition.

In another embodiment, the calcium hydroxide and/or calcium oxide concentration is from about 3.5 percent to about 4.5 percent by weight of the total refractory composition.

In another embodiment the sulfamic acid is from about 1.0 percent by weight to about 8.0 percent by weight of the total refractory composition.

In another embodiment the sulfamic acid is from about 3.0 percent by weight to about 5.0 percent by weight of the total refractory composition.

In another embodiment the sulfamic acid is from about 2.5 percent by weight to about 3.5 percent by weight of the total refractory composition.

In another embodiment the composition is a magnesia-based refractory composition for use in the production or repair of metallurgical furnace linings from about 1.0 percent by weight to about 5.0 percent by weight of the refractory composition is sulfamic acid; and from about 1.0 percent by weight to about 8.0 percent by weight of the refractory composition is calcium hydroxide.

In another embodiment the composition is a magnesia-based refractory composition for use in the production or repair of metallurgical furnace linings is from about 2 percent to about 4 percent by weight of the refractory composition is sulfamic acid; and from about 3 percent to about 5 percent by weight of the refractory composition is calcium hydroxide.

In another embodiment the composition is a magnesia-based refractory composition for use in the production or repair of metallurgical furnace linings from about 2.5 percent by weight to about 3.5 percent by weight of the refractory composition is sulfamic acid; and from about 3.5 percent by weight to about 4.5 percent by weight of the refractory composition is calcium hydroxide.

In another embodiment the composition is a magnesia-based refractory composition for use in the production or repair of metallurgical furnace linings from about 1.0 percent by weight to about 5.0 percent by weight of the refractory composition is sulfamic acid; and from about 1.0 percent by weight to about 8.0 percent by weight of the refractory composition is calcium oxide.

In another embodiment the composition is a magnesia-based refractory composition for use in the production or repair of metallurgical furnace linings is from about 2 percent to about 4 percent by weight of the refractory composition is sulfamic acid; and from about 3 percent to about 5 percent by weight of the refractory composition is calcium oxide.

In another embodiment the composition is a magnesia-based refractory composition for use in the production or repair of metallurgical furnace linings from about 2.5 percent by weight to about 3.5 percent by weight of the refractory composition is sulfamic acid; and from about 3.5 percent by weight to about 4.5 percent by weight of the refractory composition is calcium oxide.

In another embodiment the composition is a magnesia-based refractory gunning composition for use in the production or repair of metallurgical furnace linings wherein from about 1.0 percent by weight to about 5.0 percent by weight of the gunning composition is sulfamic acid; and 1.0 percent to about 8.0 percent by weight of the gunning composition is calcium hydroxide; and from about 0.05 percent to about 0.5 percent by weight of the gunning composition is a wetting agent.

In another embodiment the composition is a magnesia-based refractory gunning composition for use in the production or repair of metallurgical furnace linings wherein from about 2.0 percent by weight to about 4.0 percent by weight of the gunning composition is sulfamic acid; and 3.0 percent to about 5.0 percent by weight of the gunning composition is calcium hydroxide; and from about 0.05 percent to about 0.5 percent by weight of the gunning composition is a wetting agent.

In another embodiment the composition is a magnesia-based refractory gunning composition for use in the production or repair of metallurgical furnace linings wherein from about 2.5 percent by weight to about 3.5 percent by weight of the gunning composition is sulfamic acid; and 3.5 percent to about 4.5 percent by weight of the gunning composition is calcium hydroxide; and from about 0.05 percent to about 0.5 percent by weight of the gunning composition is a wetting agent.

In another embodiment the composition is a magnesia-based refractory gunning composition for use in the production or repair of metallurgical furnace linings wherein from about 1.0 percent by weight to about 5.0 percent by weight of the gunning composition is sulfamic acid; and 1.0 percent to about 8.0 percent by weight of the gunning composition is calcium oxide; and from about 0.05 percent to about 0.5 percent by weight of the gunning composition is a wetting agent.

In another embodiment the composition is a magnesia-based refractory gunning composition for use in the production or repair of metallurgical furnace linings wherein from about 2.0 percent by weight to about 4.0 percent by weight of the gunning composition is sulfamic acid; and 3.0 percent to about 5.0 percent by weight of the gunning composition is calcium oxide; and from about 0.05 percent to about 0.5 percent by weight of the gunning composition is a wetting agent.

In another embodiment the composition is a magnesia-based refractory gunning composition for use in the production or repair of metallurgical furnace linings wherein from about 2.5 percent by weight to about 3.5 percent by weight of the gunning composition is sulfamic acid; and 3.5 percent to about 4.5 percent by weight of the gunning composition is calcium oxide; and from about 0.05 percent to about 0.5 percent by weight of the gunning composition is a wetting agent.

In another embodiment a monolithic refractory lining is formed on a metallurgical vessel by gunning onto at least a portion of the inside surface of the vessel, a magnesia-based refractory composition containing sulfamic acid, calcia and a wetting agent.

The following non-limiting examples are merely illustrative of some embodiments of the present invention, and are not to be construed as limiting the invention, the scope of which is defined by the appended claims.

EXAMPLE 1

Four high purity magnesia refractory compositions were tested to determine high-temperature modulus of rupture in an oxidizing atmosphere and under action of a force or stress that is increased at a constant rate using the "Standard Test Method for Modulus Rupture of Refractory Materials at Elevated Temperatures" as defined under ASTM Designation C 583-80 (Reapproved 1995), except a three hour soak time was employed and two inch by two inch by nine inch test samples were used.

Figure 2:
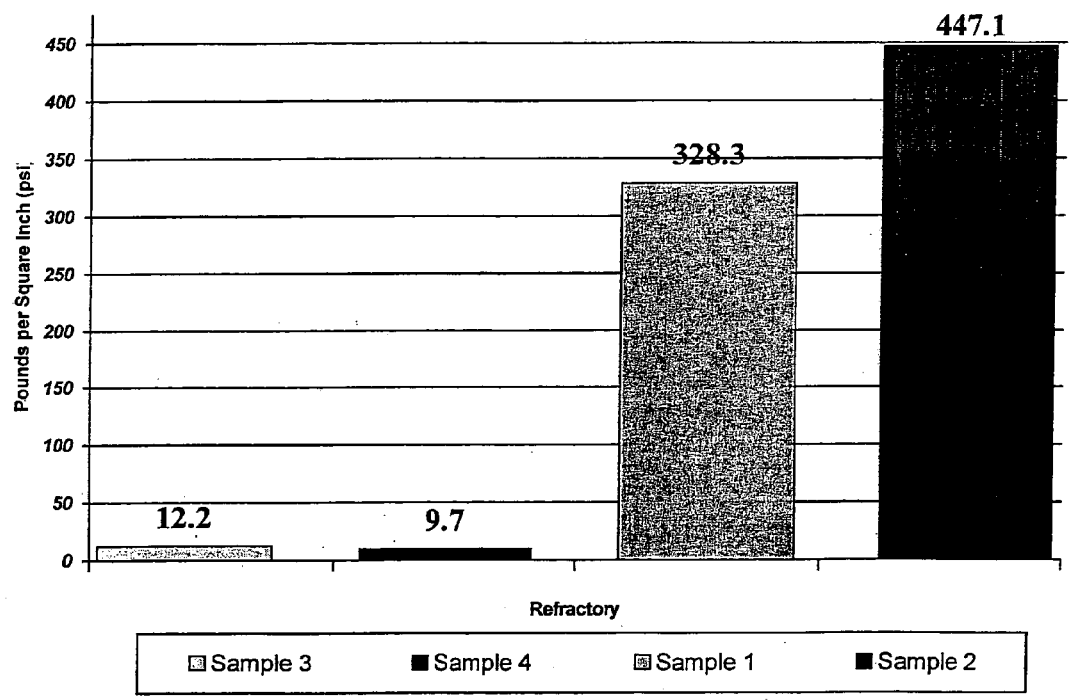
FIG. 2 is a graph comparing the 1510 degrees Celsius hot breaking strength of two high purity magnesia refractory compositions that are currently used for repairing refractory linings, with the hot breaking strength of the present invention.

Four refractory compositions were compared to determine hot strength or modulus of rupture at 1370 degrees Celsius and 1510 degrees Celsius. Two compositions produced in accordance with the present invention, Sample 1 with wetting agent and Sample 2 without wetting agent, both of which are a high purity magnesia material that is bonded with a combination of sulfamic acid and calcium hydroxide, were compared to Sample 3, which is a premium quality, high purity magnesia, silicate bonded refractory gunning product and Sample 4, which is a high purity magnesia, sulfamic acid bonded refractory gunning product. The results are shown in FIG. 1 and FIG. 2.

The 1370 degrees Celsius Hot Modulus of Rupture result show that the compositions made in accordance with the present invention have higher Hot Modulus of Rupture Strength compared with traditional silicate and sulfamic acid bonded refractory compositions.

The 1510 degrees Celsius Hot Modulus of Rupture result show that the compositions made in accordance with the present invention have higher Hot Modulus of Rupture Strength compared with traditional silicate and sulfamic acid bonded refractory compositions.

Other embodiments of the invention will be apparent to those skilled in the art from a consideration of this specification or practice of the invention disclosed herein. It is intended that the specification and examples be considered as exemplary only, with the true scope of the invention being defined by the following claims.

We claim:

1. A refractory composition comprising:
   (a) a magnesia based refractory material;
   (b) sulfamic acid; and
   (c) calcium hydroxide in concentration between greater than 5.0 percent to 8.0 percent by weight of total refractory composition.

2. The refractory composition of claim 1 wherein the calcium hydroxide concentration is between greater than 5.0 percent to about 7.0 percent by weight of the total refractory composition.

3. The refractory composition of claim 1 wherein the calcium hydroxide concentration is between 5.5 percent to about 6.5 percent by weight of the total refractory composition.

4. The refractory composition of claim 1, further comprising calcium oxide in concentration between about 0.5 percent to about 1.0 percent by weight of the total refractory composition.

5. The refractory composition of claim 2, further comprising calcium oxide in concentration between about 0.5 percent to about 1.0 percent by weight of the total refractory composition.

6. The refractory composition of claim 2, wherein the sulfamic acid is from about 1.0 percent by weight to about 5.0 percent by weight of the total refractory composition.

7. The refractory composition of claim 6, wherein the sulfamic acid is from about 2.0 percent by weight to about 4.0 percent by weight of the total refractory composition.

8. The refractory composition of claim 7, wherein the sulfamic acid is from about 2.5 percent by weight to about 3.5 percent by weight of the total refractory composition.

9. The refractory composition of claim 1 wherein the sulfamic acid is from about 1.0 percent by weight to about 5.0 percent by weight of the total refractory composition.

10. The refractory composition of claim 9 wherein the sulfamic acid is from about 2.0 percent by weight to about 4.0 percent by weight of the total refractory composition.

11. The refractory composition of claim 10 wherein the sulfamic acid is from about 2.5 percent by weight to about 3.5 percent by weight of the total refractory composition.

12. A refractory gunning composition consisting essentially of:
 a) a magnesia-based refractory;
 b) sulfamic acid;
 c) calcium hydroxide in concentration between greater than 5.0 percent to 8.0 percent by weight of total refractory composition; and
 d) a wetting agent.

13. The gunning composition according to claim 12, wherein the sulfamic acid concentration is from about 1.0 percent to about 5.0 percent by weight of the gunning composition;
 the wetting agent concentration is from about 0.05 percent to about 0.5 percent by weight of the gunning composition; and
 further comprising calcium oxide in concentration from about 0.5 percent to about 1.0percent by weight of the total refractory composition.

14. The gunning composition according to claim 12, wherein the sulfamic acid concentration is from about 2.0 percent to about 4.0 percent by weight of the gunning composition;
 the wetting agent concentration is from about 0.05 percent to about 0.5 percent by weight of the gunning composition; and
 further comprising calcium oxide in concentration from about 0.5 percent to about 1.0 percent by weight of the total refractory composition.

15. The gunning composition according to claim 12, wherein the sulfamic acid concentration is from about 2.5 percent to about 3.5 percent by weight of the gunning composition;
 the wetting agent concentration is from about 0.05 percent to about 0.5 percent by weight of the gunning composition; and
further comprising calcium oxide in concentration from about 0.5 percent to about 1.0 percent by weight of the total refractory composition.

16. The gunning composition according to claim 12, wherein the calcium hydroxide concentration is from greater than 5.0 percent to about 7.0 percent by weight of the total refractory composition.

17. The gunning composition according to claim 16, wherein the sulfamic acid concentration is from about 1.0 percent to about 5.0 percent by weight of the gunning composition;
 the wetting agent concentration is from about 0.05 percent to about 0.5 percent by weight of the gunning composition; and
 further comprising calcium oxide in concentration from about 0.5 percent to about 1.0 percent by weight of the total refractory composition.

18. The gunning composition according to claim 16, wherein the sulfamic acid concentration is from about 2.0 percent to about 4.0 percent by weight of the gunning composition;
 the wetting agent concentration is from about 0.05 percent to about 0.5 percent by weight of the gunning composition; and
 further comprising calcium oxide in concentration from about 0.5 percent to about 1.0 percent by weight of the total refractory composition.

19. The gunning composition according to claim 16, wherein the sulfamic acid concentration is from about 2.5 percent to about 3.5 percent by weight of the gunning composition;
 the wetting agent concentration is from about 0.05 percent to about 0.5 percent by weight of the gunning composition; and
further comprising calcium oxide in concentration from about 0.5 percent to about 1.0 percent by weight of the total refractory composition.

20. The gunning composition according to claim 12, wherein the calcium hydroxide concentration is between 5.5 percent to about 6.5 percent by weight of the total refractory composition.

* * * * *